(12) United States Patent
Maidl

(10) Patent No.: US 10,007,640 B2
(45) Date of Patent: Jun. 26, 2018

(54) METHOD FOR ASCERTAINING THE FERTILIZER REQUIREMENT, IN PARTICULAR THE NITROGEN FERTILIZER REQUIREMENT, AND APPARATUS FOR CARRYING OUT THE METHOD

(75) Inventor: Franz-Xaver Maidl, Wallerfing (DE)

(73) Assignee: Technische Universität München, Munich (DE)

( * ) Notice: Subject to any disclaimer, the term of this patent is extended or adjusted under 35 U.S.C. 154(b) by 419 days.

(21) Appl. No.: 14/002,638

(22) PCT Filed: Mar. 2, 2012

(86) PCT No.: PCT/EP2012/053589
§ 371 (c)(1),
(2), (4) Date: Aug. 30, 2013

(87) PCT Pub. No.: WO2012/119931
PCT Pub. Date: Sep. 13, 2012

(65) Prior Publication Data
US 2013/0338931 A1    Dec. 19, 2013

(30) Foreign Application Priority Data

Mar. 4, 2011 (DE) .................. 10 2011 001 096
Jun. 6, 2011 (DE) .................. 10 2011 050 877

(51) Int. Cl.
| | | |
|---|---|---|
| *C05C 9/00* | (2006.01) | |
| *G06F 15/00* | (2006.01) | |
| *A01B 79/00* | (2006.01) | |
| *A01B 79/02* | (2006.01) | |
| *A01C 15/00* | (2006.01) | |
| *A01C 17/00* | (2006.01) | |
| *A01C 21/00* | (2006.01) | |

(52) U.S. Cl.
CPC ............ *G06F 15/00* (2013.01); *A01B 79/005* (2013.01); *A01B 79/02* (2013.01); *A01C 15/00* (2013.01); *A01C 17/00* (2013.01); *A01C 17/008* (2013.01); *A01C 21/00* (2013.01); *A01C 21/007* (2013.01)

(58) Field of Classification Search
None
See application file for complete search history.

(56) References Cited

U.S. PATENT DOCUMENTS

| | | | | |
|---|---|---|---|---|
| 6,199,000 B1* | 3/2001 | Keller | .................. | A01B 79/005 342/357.52 |
| 6,880,291 B2 | 4/2005 | Raun et al. | | |
| 2003/0019152 A1* | 1/2003 | Raun | .................. | A01C 21/007 47/58.1 SC |
| 2004/0231239 A1* | 11/2004 | Raun | .................. | A01C 21/007 47/58.1 SC |
| 2004/0237394 A1 | 12/2004 | Mayfield et al. | | |
| 2008/0097653 A1* | 4/2008 | Kaprielian | ........... | A01C 23/042 700/284 |
| 2010/0115830 A1* | 5/2010 | Dube | .................... | A01G 7/045 47/17 |
| 2013/0120753 A1* | 5/2013 | Haas | .................... | G01N 21/31 356/448 |

FOREIGN PATENT DOCUMENTS

| | | |
|---|---|---|
| CN | 1387752 | 1/2003 |
| DE | 19913971 | 9/2000 |
| EP | 0843958 | 5/1998 |
| EP | 1166613 | 1/2002 |
| WO | 200013478 | 3/2000 |
| WO | 01045490 | 6/2001 |
| WO | 2002069230 | 9/2002 |
| WO | 2003009669 | 2/2003 |
| WO | 2005107432 | 11/2005 |

OTHER PUBLICATIONS

Maidl, Teilflächenspezifische N-Düngung, IKB Abschluss-Symposium, Oct. 11-12, 2005, Weihenstephan, Germany.
Office Action dated May 25, 2015, from corresponding CN App. No. 201280011769.2.

* cited by examiner

*Primary Examiner* — Anna Skibinsky
(74) *Attorney, Agent, or Firm* — Boyle Fredrickson S.C.

(57) ABSTRACT

A method and a device for discharging fertilizer for agricultural cultivated plants are disclosed. According to the invention, the required quantity of fertilizer is determined depending on the current nutrient uptake (nutrient status), optimum nutrient uptake (nutrient requirement) by the fertilizing deadline, and optimum nutrient uptake (nutrient requirement by the next fertilizing deadline, wherein other influencing factors are taken into consideration via a correction factor DIMA.

9 Claims, 11 Drawing Sheets

Table: Factor DIMA

Figure 1:
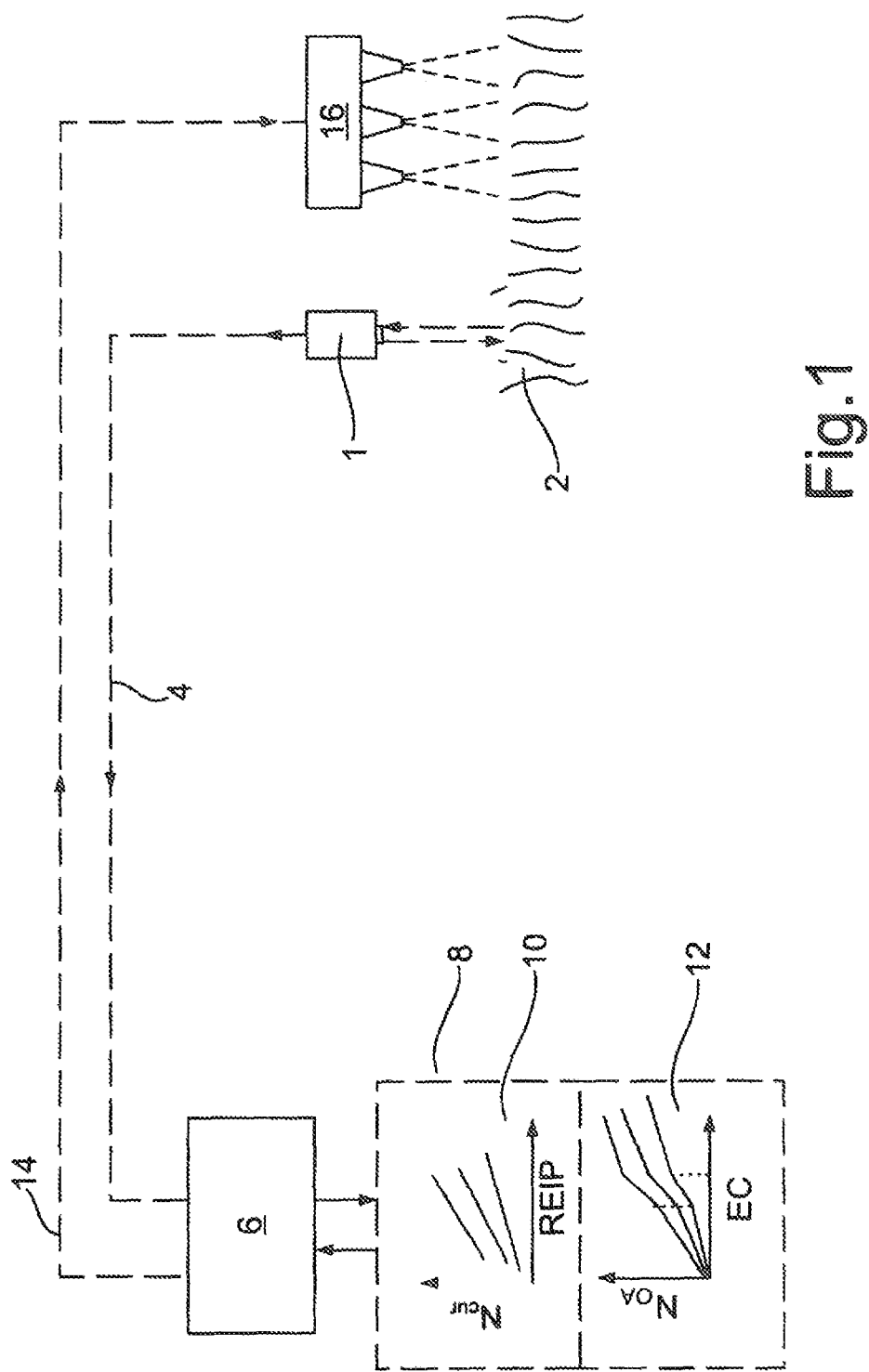

Factor DIMA of winter wheat for different EC stages as a function of the possible and/or intended fertilizer utilization

|              | A = 0.75 | A = 0.85 | A = 1.0 | A = 1.1 |
|---|---|---|---|---|
| VB to EC 30   | 1.36 | 1.20 | 1.00 | 0.91 |
| EC 30 to EC 32 | 1.13 | 1.00 | 0.85 | 0.77 |
| EC 32 to EC 37 | 1.13 | 1.00 | 0.85 | 0.77 |
| EC 37 to EC 49 | 0.97 | 0.86 | 0.73 | 0.66 |
| EC 49 to EC 65 | 0.73 | 0.64 | 0.54 | 0.49 |
| EC 65 to EC 92 | 1.04 | 0.92 | 0.78 | 0.71 |

A = fertilizer utilization rate

Fig. 10

METHOD FOR ASCERTAINING THE FERTILIZER REQUIREMENT, IN PARTICULAR THE NITROGEN FERTILIZER REQUIREMENT, AND APPARATUS FOR CARRYING OUT THE METHOD

BACKGROUND OF THE INVENTION

1. Field of the Invention

The invention relates to a method for ascertaining the fertilizer requirement of an agricultural cultivated plant, and to a device for dosing fertilizer.

2. Description of the Related Art

In the field of precision farming, a subarea-specific fertilizer administration constitutes one of the major challenges. Overfertilization is a problem both from an ecological and from an economic view. In the case of underfertilization, the yield of the field is reduced, so that a demand-optimized fertilization has to be striven for.

Due to the heterogeneity of soil and microclimate, the productivity and the availability of nutrients from the soil vary within an agricultural plot. These heterogeneities result in different growths of the plants and in differentiated yields and correspondingly different fertilizer requirement. Presently, in agricultural practice, the quantity of nitrogen fertilizer is discharged in a uniform dosage across the entire agricultural plot—the heterogeneities mentioned are frequently not taken into consideration. Such uniform fertilization results in a more or less large under and/or overfertilization in individual partial areas with the drawbacks involved therewith.

A system for a subarea-specific fertilization is known in which the nutrient status of a plant is detected by means of a sensor, and the fertilizer requirement is then calculated as a function of the sensor signal, for instance, a vegetation index and subarea-specific data to be retrieved in an onboard computer or online. On the basis of the fertilizer requirement, a control signal is then generated for a fertilizer dosing device (discharger). Such a solution is, for instance, disclosed in DE 199 13 971 A1.

In the case of these solutions, the sensor for detecting the vegetation index has to be calibrated before it starts operating. This may, for instance, be performed by a so-called N tester that has, however, a number of disadvantages. The use of such an N tester is extremely cumbersome and requires certain experience. The N tester measures the transmission of light through the leaves of plants. This value is closely correlated with the chlorophyll and N content, but not with the quantity of biomass. The N uptake that is important for the assessment of the fertilizer is calculated from the N content and the biomass. It is a problem that the N uptake is determined rather by the biomass of the plant than by the N content. As mentioned, the productivity of the location is not taken into account during the assessment of the fertilizer. This productivity, however, influences the nutrient requirement more than fluctuations in the N concentration of the plant. Plants on subareas with weak productivity always have low N concentrations—on such subareas, due to other parameters limiting productivity, low N quantities are accordingly also sufficient for an optimum growth, so that, if the productivity is disregarded, such subareas are regularly overfertilized. Subareas with high productivity, however, rather tend to get not enough fertilizer.

Moreover, the measurement value of the sensor depends strongly on the variety, for which reason so-called variety correction tables are often supplied. Since, however, a plurality of varieties are admitted every year by the Bundessortenamt [Federal Office for Plant Varieties], these variety correction tables accordingly have to be updated every year, which further aggravates the handling of the sensor.

EP 1 411 758 B1 describes a method for discharging fertilizer, wherein a maximally achievable yield and a yield predicted for the respective area as well as the nutrient uptake of the plant with the optimum yield and the yield predicted for the agricultural plot are included in the calculation of the quantity of fertilizer. This method provides only a one-time fertilization during the vegetation period.

From prior art, a plurality of vegetation indexes are known; the so-called REIP (Red Edge Inflection Point) vegetation index is frequently used. Of course, other vegetation indexes such as NDVI, IRR, IRG, IRI, SAVI, etc. may also be used. In the case of the REIP index, the light absorption and/or reflection behavior of plants is utilized. Accordingly, these plants have the general property of absorbing the light of particular wavelengths for a major part while reflecting the light with longer waves for a major part. Thus, the blue, green, or red light portions are absorbed by the leaves of a plant, wherein the cell structure and the water content of the plant result in that the absorption in the beginning infrared range transits to a reflection in a steep edge (inflection point). Investigations have evidenced that this main inflection point (REIP) may be used for ascertaining the bio mass growth and the nitrogen content.

A sensor for ascertaining the chlorophyll content is known from WO 01/45490 A1.

In the scope of the IKB final symposium of 11 to 12 Oct. 2005 in Weihenstephan, aspects of the subarea-specific N fertilization were discussed. In the lecture in the scope of the IKB partial project 9 "Optimierung der teilflächenspezifischen Bestandsführung mit berührungsloser Sensorik nach Bestandsheterogenität" [Optimization of the subarea-specific crop management with a touchless sensor system pursuant to crop heterogeneity], the usability of the above-mentioned vegetation indexes is represented in a comparison. Furthermore, the inventor of the instant invention explains in the lecture "Teilflächenspezifische N-Düngung" [Subarea-specific N fertilization] during the final symposium mentioned that the optimum N uptake depends very strongly on the stage of development and on the yield potential in the respective partial agricultural plot.

SUMMARY OF THE INVENTION

It is an object of the invention to provide a method for discharging fertilizer, in particular N fertilizer, and a device for performing such a method, by which it is possible to take into consideration the subarea-specific aspects during the dosing of the fertilizer in an improved manner, wherein the efforts with respect to regulation technology and device technology are to be further minimized.

This object is solved by a method with the features of claim 1 and a device with the features of claim 10.

Advantageous further developments of the invention are the subject matter of the subclaims.

In accordance with the invention, with the method for ascertaining the fertilizer requirement of an agricultural cultivated plant, a characteristic diagram (or a table) is first of all stored in a data memory, representing the current nutrient uptake (nutrient state) of the plant at least as a function of a vegetation index and/or a stage of development of the plant.

Furthermore, a characteristic diagram (table) is stored in the data memory which comprises the optimum nutrient uptake of the plant as a function of the stage of development and/or of the yield to be expected and/or of the product quality (crude protein content) in a partial agricultural plot to be fertilized.

In a measuring step, the vegetation index in the partial agricultural plot to be fertilized is measured, and the current nutrient uptake is read out from the corresponding characteristic diagram/table.

In a further step, the optimum nutrient uptake (nutrient status) in this partial agricultural plot is read out with the current stage of development and/or the yield potential in this partial agricultural plot, and then a quantity of fertilizer is calculated from the difference between the optimum nutrient status and the nutrient requirement by the next fertilizing deadline, and this difference is offset against a correction factor determined from subarea-specific parameters. These parameters may, for instance, be the duration of effect of the fertilizer, the fertilizer immobilization in the soil, the mineralization from the soil, and the fertilizer utilization rate. The stage of development of the plants in the subarea observed may also be included in this correction factor.

Via an evaluation unit, a control signal is then output to a fertilizer dosing feeder, and a quantity of fertilizer is dosed as a function of the above-mentioned amount.

This method is carried out at least once for every partial agricultural plot, so that a highly efficient subarea-specific fertilization takes place, with under or overfertilization being avoided, and hence the yield potential of the respective subarea is utilized optimally.

In a particularly preferred further development of the invention, the difference from nutrient uptake the expected nutrient requirement by the next vegetation cycle and the current nutrient status is additionally included in the calculation of the nutrient requirement. This difference is added to the afore-explained difference.

The evaluation of the measurement signals is particularly simple if the characteristics for ascertaining the current nutrient uptake (nutrient status) from the sensor signal are chosen in a first approximation as straight lines or sections of straight lines. As will be explained in more detail in the following, these straight lines are distinctly dependent on the stage of development of the plant.

In one embodiment according to the invention, the intercept of this straight line itself is ascertained from an estimation function, preferably a straight line with a negative slope, so that the intercept decreases with an increasing medium fertilizer uptake of the plant in the observed stage of development and with the yield potential of the subarea.

The slope of this straight line is also again ascertained from an estimation function, preferably a straight line, wherein the slope increases with the afore-mentioned medium nutrient uptake.

In accordance with the invention it is preferred if the vegetation index is the REIP vegetation index.

The magnitude of the afore-mentioned correction factor for calculating the quantity of fertilizer to be dosed lies, for instance, in the range of 0.5 to 1.5.

The device for discharging (spreading) of fertilizer according to the invention comprises a data memory for storing the afore-described characteristics representing the intended nutrient status or the optimum nutrient uptake as a function of the respective stages of development in the partial agricultural plots to be fertilized, the intended plant quality in these partial agricultural plots, and the yield to be expected in the partial agricultural plots. The device further comprises a sensor for detecting the vegetation index and an evaluation unit for selecting the suitable characteristics/tables and for reading out the current nutrient uptake (nutrient status) as a function of the vegetation index, and for reading out an optimum nutrient uptake and the subarea-specific correction value, and for calculating the quantity of fertilizer from these parameters. Via the unit, a dosing signal is further output to a fertilizer dosing device and the same is controlled accordingly.

BRIEF DESCRIPTION OF THE PREFERRED EMBODIMENTS

Figure 2:
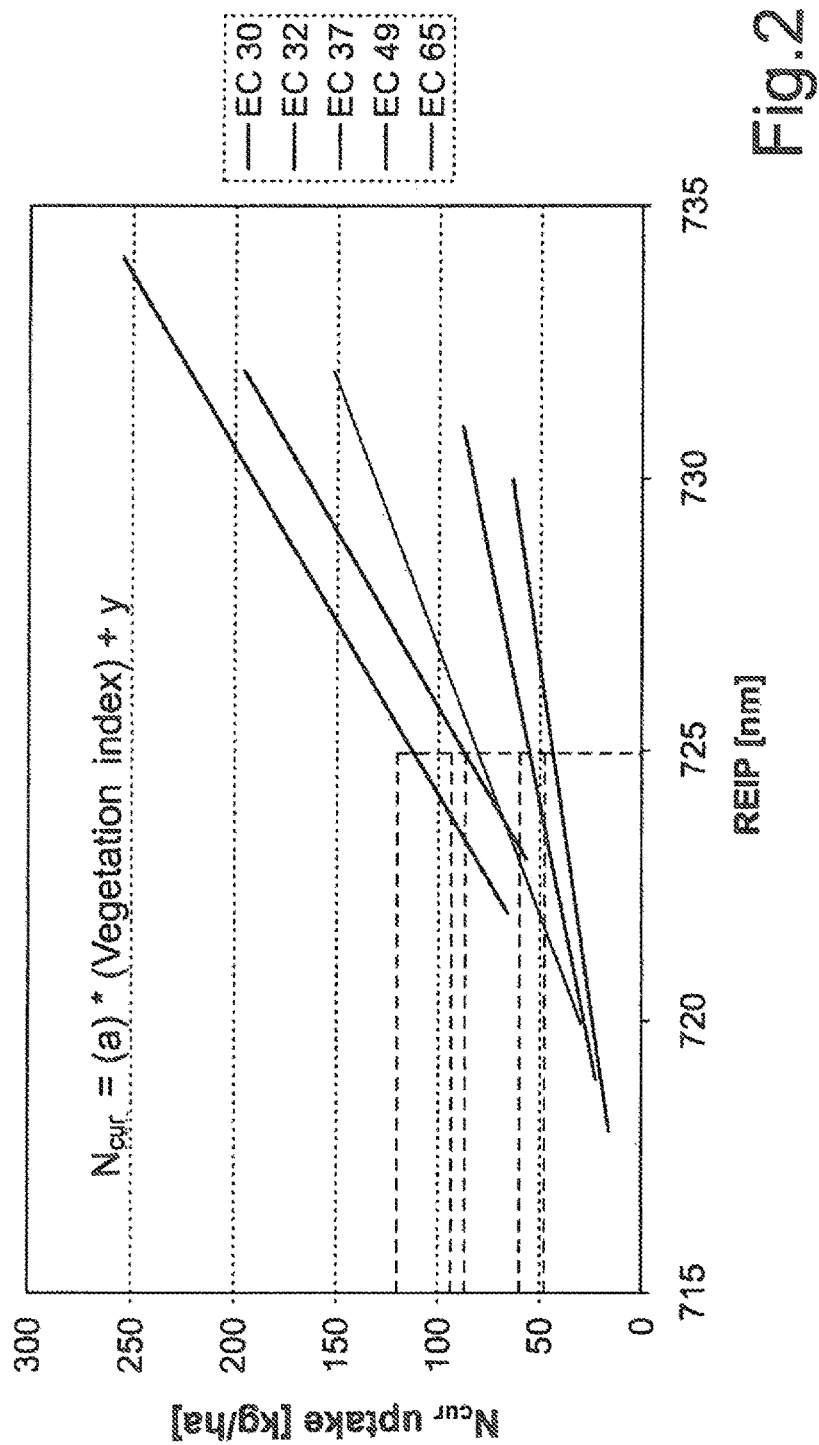
Figure 3:
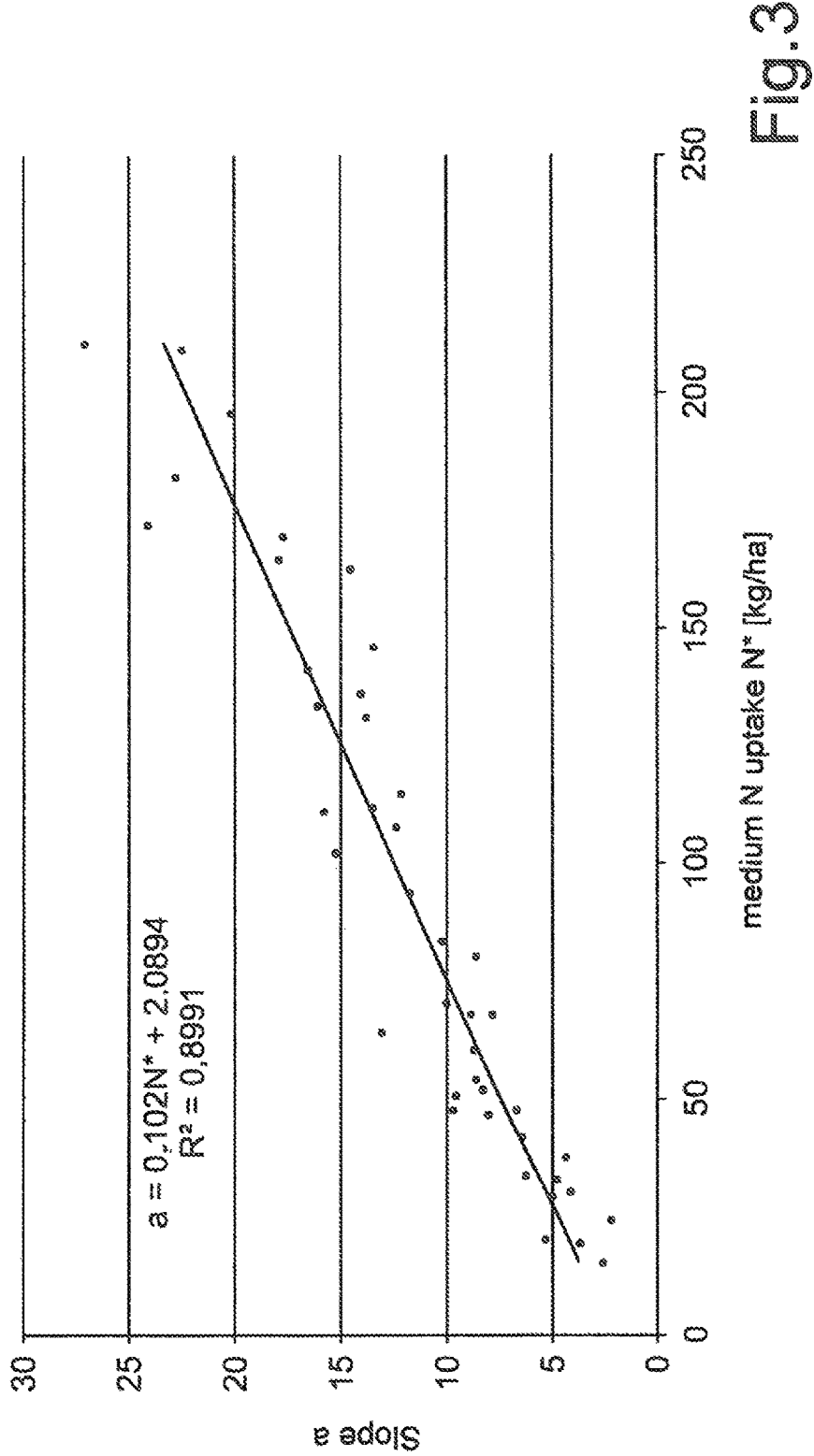
Figure 4:
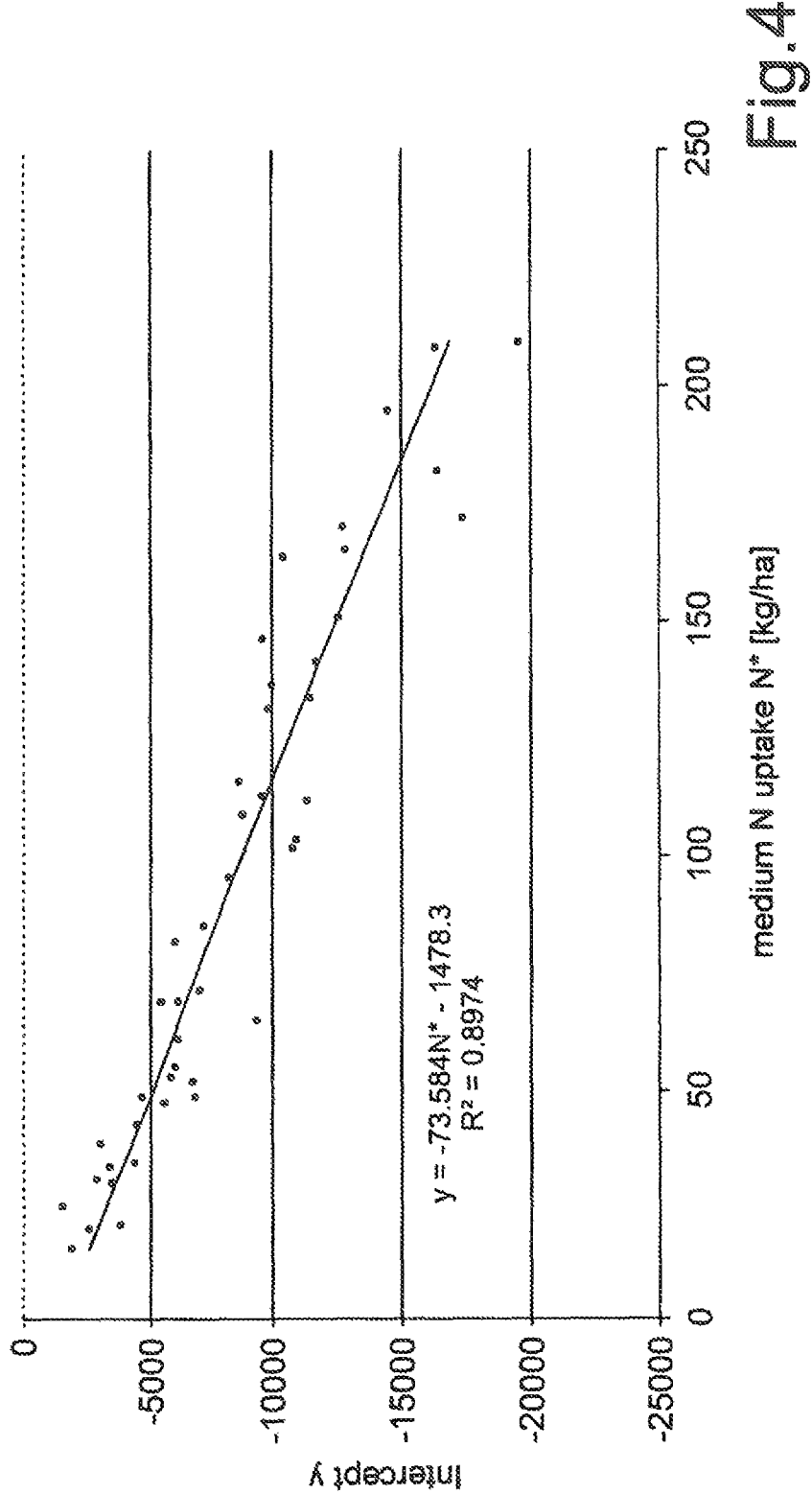
Figure 5:
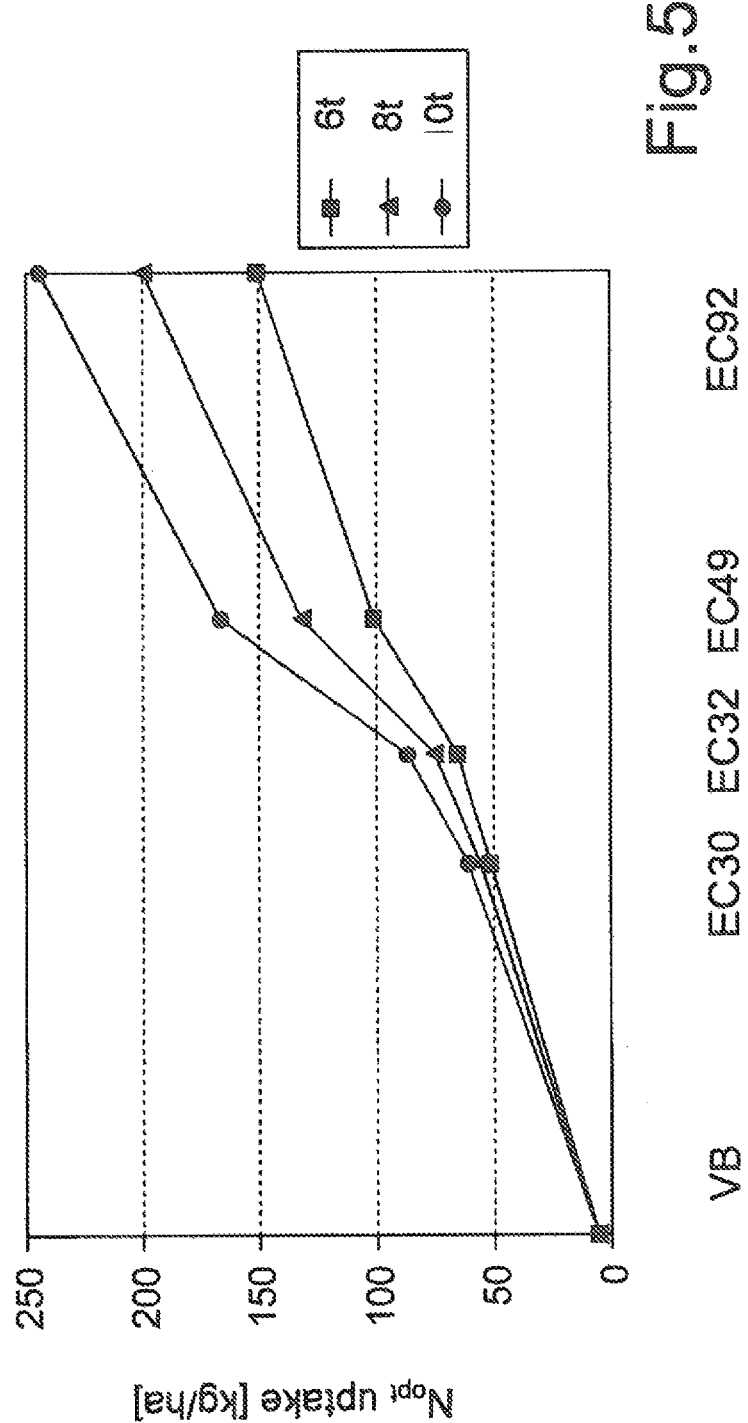
Figure 6:
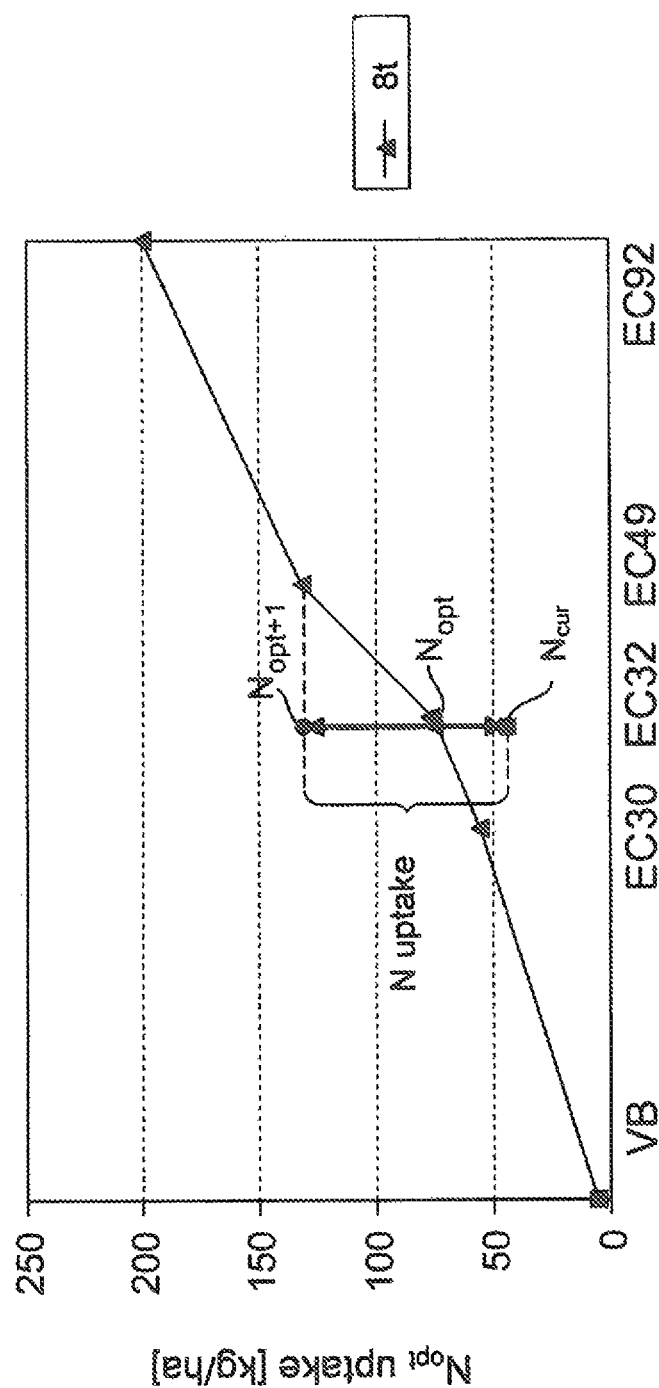
Figure 7:
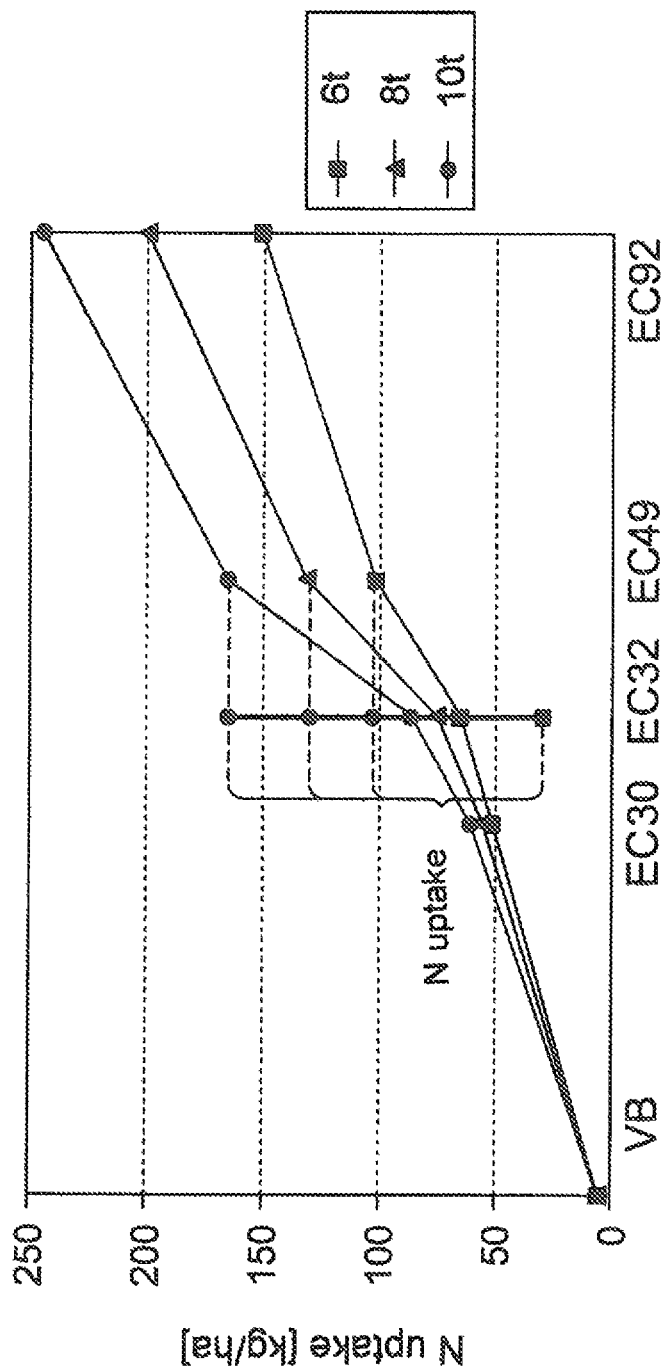
Figure 8:
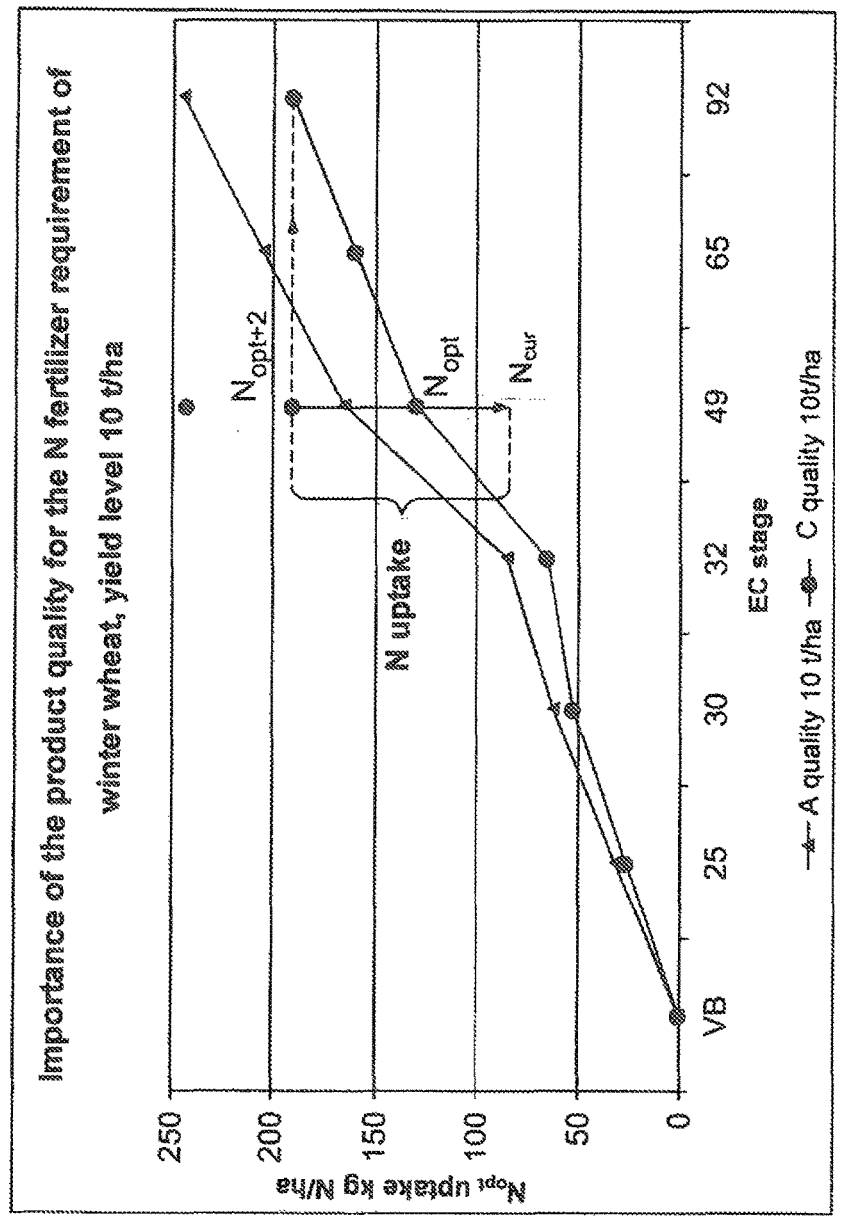
Figure 9:
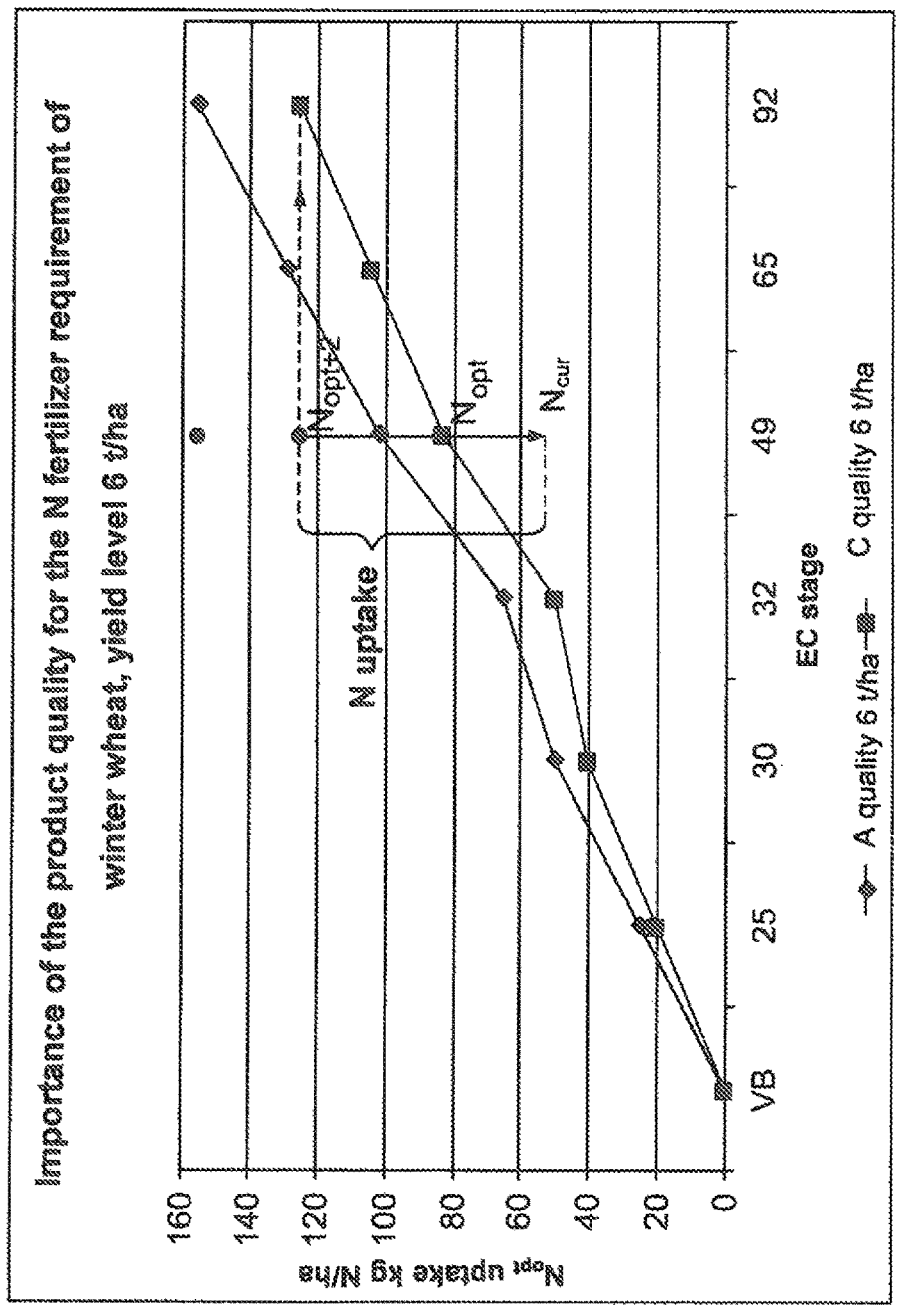
Figure 11:
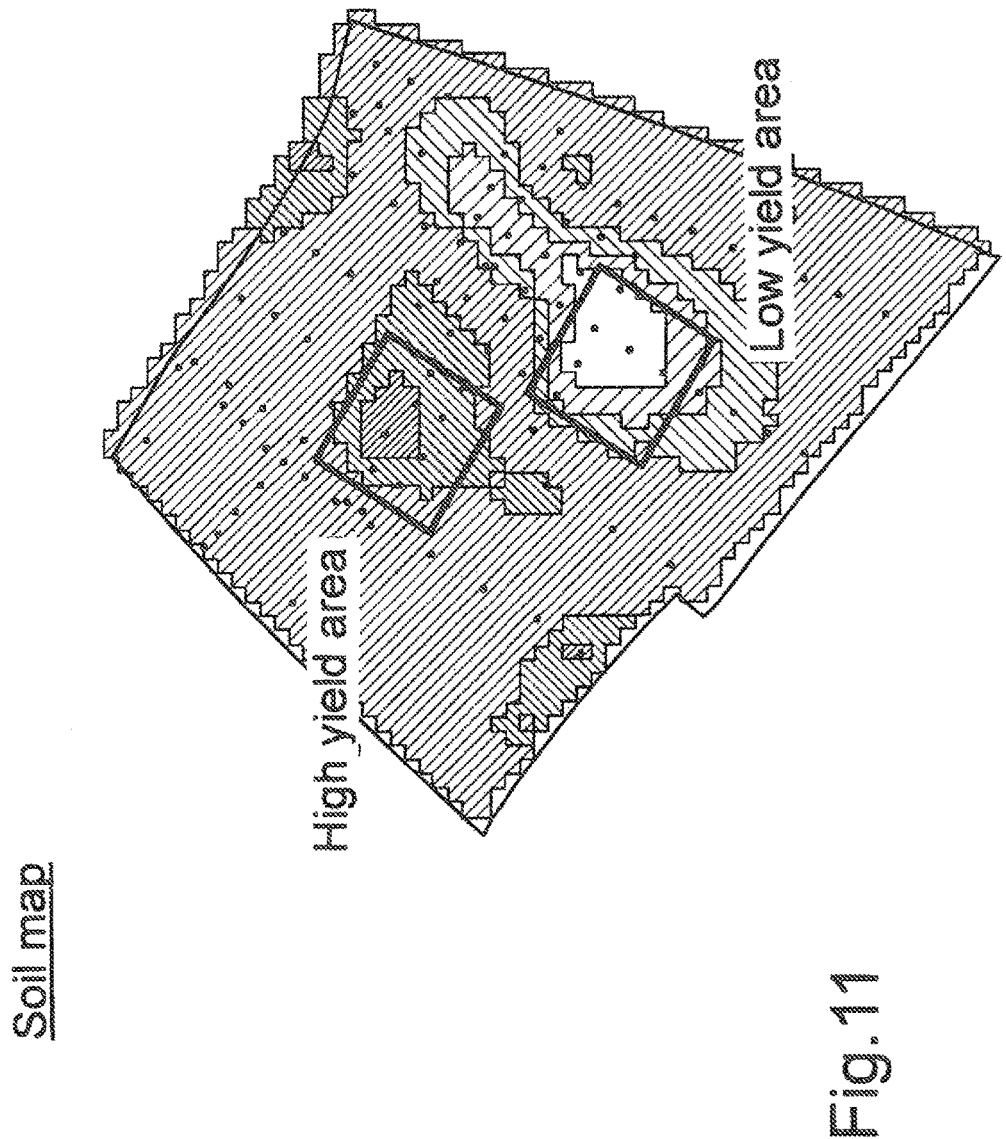

Preferred embodiments (for winter wheat, as an example) of the invention will be explained in detail in the following by means of schematic drawings. They show:

FIG. 1 a block diagram of essential features of a device for discharging fertilizer;

FIG. 2 a characteristic diagram for determining a current N uptake as a function of a vegetation index and the stage of development;

FIGS. 3 and 4 linear equations for ascertaining the characteristics pursuant to FIG. 2;

FIG. 5 a characteristic diagram for ascertaining the optimum N uptake of winter wheat as a function of the stage of development and the yield potential;

FIG. 6 a characteristic from the characteristic diagram pursuant to FIG. 5 with the N uptake indicated;

FIG. 7 the characteristic diagram pursuant to FIG. 5 in which the necessary N uptake is indicated as a function of the stage of development, the yield potential, and a correction factor;

FIGS. 8 and 9 characteristic diagrams for illustrating the dependence of the optimum N uptake on the stage of development and the product quality with different yield expectations using the example of winter wheat;

FIG. 10 a table for ascertaining the correction factor DIMA as a function of a fertilizer utilization rate and the stage of development; and FIG. 11 a soil map for illustrating different yield regions of a field.

DETAILED DESCRIPTION OF THE PREFERRED EMBODIMENTS

FIG. 1 shows a strongly schematized block diagram for illustrating the method according to the invention.

Accordingly, one or several sensors 1 for detection are arranged at an agricultural tractor or another utility vehicle.

On principle, such a sensor consists of a plurality of light transmitting elements emitting, for instance, monochromatic light of a predetermined wavelength. The sensor 1 further comprises a light receiving element receiving the light reflected by the plants 2 and generating a signal indicative of the respective intensity of the received light. The control of the light transmitting elements is performed via a controller integrated in the sensor 1 which controls the light transmitting elements in a cyclic sequence and determines the respective intensity of the reflected light from the output signal of the light receiving element. The REIP vegetation index is then calculated from the light intensities determined over the entire measurement cycle. The measurement signal 4 corresponding to the vegetation index (REIP) is then supplied to an evaluation unit 6 of a central processing unit of the agricultural tractor. A data memory 8 is assigned to this evaluation unit 6 in which some characteristics and subarea-specific data for calculation of a quantity of fertilizer to be discharged are stored, which will be explained in more detail in the following.

From multi-spectral reflection measurements performed by the applicant under various environmental aspects, numerous vegetation indexes described in literature were calculated and examined for stability (variety dependence, angle of incidence of the sun, leaf moisture, size of plant, nutrition status of the plants, etc.). The vegetation index REIP turned out to be very stable, so that the calculation of the quantity of fertilizer explained in the following was also performed on the basis of this index. With respect to the stage of development of the plants, the different vegetation indexes and also the REIP turned out to be very sensitive during these tests. Accordingly, for every plant/variety a characteristic diagram (or a table) is stored in the data memory which enables to ascertain the N uptake as a function of the REIP and of the stage of development EC. FIG. 2 shows, by way of example, a characteristic diagram 10 for an agricultural cultivated plant—the strong dependence of the absolute N uptake (kg/ha) on the stage of development of the cultivated plant as mentioned above can be recognized. Thus, with a particular REIP value of, for instance, 725 nm, the absolute N uptake is in an earlier stage of development by far more than half lower than in the stage of development 65.

Now, if one intended to store the corresponding characteristics 10 for every agricultural cultivated plant and for every stage of development of this plant, this would result in an excessive quantity of data that is difficult to master both with respect to hardware technology and to software technology. In the scope of the invention, an estimation algorithm has therefore been developed which enables to indicate the absolute nitrogen uptake of the plants irrespective of the stage of development. Due to the known great importance of the stage of development of the plants for the peculiarity of the REIP, extensive examinations have been performed, and it was found that the regression members of the estimation algorithms for ascertaining the above-mentioned characteristics 10, which will be explained in the following, are in extremely close correlation with the plant development. In a first approximation, every characteristic of the characteristic diagram 10 illustrated in FIG. 2 may be represented by a straight line:

$$N_{cur} = (a)*(REIP) + y$$

wherein $N_{cur}$ is the current nutrient uptake of the plant, a the slope of the characteristic, and y the intercept of the characteristic.

In FIGS. 3 and 4, the dependence of the intercept y and of the slope a of this characteristic is illustrated by way of example for winter wheat. One recognizes that the slope a (FIG. 3) rises with increasing medium N uptake N* of the examined plants pursuant to the equation:

$$A = 0.102 N^* + 2.0894$$

wherein the statistic coefficient of determination $R^2 = 0.8991$.

The above-mentioned equation for ascertaining the slope a was determined by the evaluation of existing measurement results, wherein the respective reading points are illustrated in FIG. 3.

FIG. 4 illustrates a diagram for ascertaining the intercept y from the medium N uptake N*. One recognizes that the intercept y is also in a linear relationship with the medium N uptake N*. The calculation equation reads, with the examined winter wheat and on the condition of a medium yield potential and a particular stage of development EC:

$$Y = -73.584 N^* - 1478.3$$

wherein the statistic coefficient of determination is again very high with $R^2 = 0.8974$. Accordingly, the intercept v decreases with increasing medium N uptake N*.

From these two equations for ascertaining the intercept y and the slope a of the respective characteristic, knowing the medium N uptake N* of the plant, the characteristic for ascertaining the absolute N uptake $N_{cur}$ (nutrient status) may thus be determined for the respective stage of development and yield potential of the examined location.

This system was examined with numerous agricultural cultivated plants (winter wheat, summer wheat, winter rape, winter barley, summer barley, Triticale, winter rye), and it turned out that it works with all plant varieties mentioned, wherein the statistic coefficients of determination are always greater than 0.85, so that it has to be assumed that the ascertained algorithm may also be used with other agricultural cultivated plants. By means of these algorithms it is thus possible to indicate for the respective cultivated plant, knowing the REIP, the biomass in (kiln and the N uptake in kg nitrogen/ha at any stage of development of the plant.

In other words, the respectively valid characteristic for ascertaining the current N uptake $N_{cur}$ may be calculated by means of the above-mentioned equations as a function of the stage of development EC and of the REIP in a simple manner.

In the following step, the actual fertilizer requirement is now ascertained from the current N uptake (nutrient status) $N_{cur}$ ascertained by measurement.

The basis for ascertaining the fertilizer requirement is the knowledge of the optimum N supply conditions, i.e. the optimum values for the nitrogen nutrition status of the respective cultivated plant. When ascertaining these optimum values it is assumed that they depend on the growth conditions of the location. For examination of this assumption, different test runs and also data in literature were inspected and calculated for winter wheat as an example. It turned out that the optimum N uptake values (here for winter wheat, as an example) may be illustrated pursuant to the relationships shown in FIG. 5 as a function of the stage of development EC and of the yield range (t/ha). One recognizes that the optimum N uptake $N_{opt}$ increases with increasing stage of development EC, wherein, of course, the N uptake values $N_{opt}$ are again distinctly higher for areas with high yield than for areas with weak yield. The optimum N uptake $N_{opt}$ with predetermined yield range and stage of development may, in accordance with FIG. 5, be illustrated as a characteristic that is composed by approximation of a plurality of straight line sections, wherein a modification of the slope takes place at the respective stage of development (EC30, EC32, . . . ).

FIG. 6 illustrates the corresponding characteristic for the yield range of 8 t/ha. The current N uptake $N_{cur}$ of the plant in the examined partial agricultural plot is also indicated in FIG. 6, which was ascertained pursuant to the characteristic of FIG. 2 with knowledge of the REIP measured by the sensor 1. The required quantity of fertilizer is then calculated pursuant to the equation:

$$N = [(N_{opt} - N_{cur}) + (N_{opt+1} - N_{opt})] * DIMA$$

wherein N is the quantity of fertilizer to be discharged in kg nitrogen/ha, $N_{opt}$ the optimum N uptake ascertained from the relationship pursuant to FIG. 5, $N_{cur}$ the current N uptake ascertained from the REIP, $N_{opt+1}$ the optimum N uptake by the next fertilizing deadline, and DIMA a correction factor.

This correction factor DIMA is composed of the components of duration of effect of the fertilizer D, N immobilization in the soil I, mineralization from the soil M, and fertilizer utilization rate A. These coefficients of the factor DIMA were derived from N fertilization tests at different locations and from data of literature. The individual coefficients of the DIMA are set relative to the yield level. In FIG. 6, the respective parameters ($N_{cur}$, $N_{opt}$, $N_{opt+1}$) are indicated, wherein, for convenience, DIMA is equal to 1. Since $N_{cur}$ is distinctly smaller than $N_{opt}$ with the planned fertilization deadline, an undersupplied crop exists—in order to ensure sufficient N supply by the next fertilizing deadline, the quantity of nitrogen indicated by parentheses in the illustration of FIG. 6 would have to be supplied per hectare of subarea.

FIG. 7 illustrates the relations of FIG. 6 for different yield potentials—accordingly, with an increasing yield potential a larger quantity of nitrogen has to be discharged to avoid underfertilization.

By means of FIGS. 8 and 9, the dependence of the N uptake on the product quality is explained. FIG. 8 illustrates by way of example the dependence of the optimum N uptake on the stage of development (similar to the characteristic diagrams in FIGS. 6 and 7) and on the product quality of winter wheat, wherein the upper characteristic in FIG. 8 stands for winter wheat with A quality and the lower characteristic for C quality with equal yield level (10 t/ha). FIG. 9 shows corresponding characteristics with a lower yield level of 6 t/ha.

These characteristics illustrate that the optimum N uptake depends relatively strongly on the plant quality, wherein, as expected, a higher fertilizer requirement exists with a higher quality (A quality) than with a relatively lower plant quality.

One aspect of the described invention thus consists in collecting the characteristic diagrams for the respective plant variety, wherein the optimum nitrogen uptake preferably has to be detected as a function of the stage of development, the yield potential, and also of the plant quality.

In FIG. 9, the quantity of fertilizer to be discharged is also indicated by way of example, wherein the current nutrient status $N_{cur}$ (see FIG. 2) ascertained via the vegetation index is again started out from, and then the quantity of fertilizer to be discharged is ascertained from the characteristic diagrams explained, for instance, as a function of the product quality, the stage of development, and the yield expectation/yield level. In the embodiment pursuant to FIG. 9, the quantity of fertilizer (N) is calculated by the next but one stage of development (EC92). Of course—like with the embodiments pursuant to FIGS. 6 and 7—the quantity of fertilizer may also be calculated by the next stage of development (here EC65).

In these embodiments, the correction factor is again equal to 1 for convenience.

As already explained, this correction factor DIMA is composed of the factors D (duration of effect of the fertilizer), I (nitrogen immobilization in the soil), M (nitrogen mineralization from the soil), and A (utilization rate of the fertilizer). Examples for the dependence of the factor DIMA on the stage of development and on the utilization rate of the fertilizer A are illustrated in the table pursuant to FIG. 10. It reveals that the correction factor DIMA has a great influence on the ascertaining of the quantity of fertilizer to be discharged since it may fluctuate by more than 30% alone due to different fertilizer utilization rates in a stage of development. In the table of FIG. 10 it has to be noted that other cultures have another growth rhythm and another soil root penetration, so that the values for the different EC stages change accordingly.

The factor D is highly dependent on the soil root penetration and on the growth intensity of the cultivated plant. Small or young plants have small roots and weak growth. Accordingly, it takes very long until the fertilizer is incorporated and/or large quantities of fertilizer (high nutrient concentrations in the soil) are necessary for a particular nutrient uptake in a given time. Earlier stages of development require comparatively high DIMA values pursuant to the table in FIG. 10.

The factors I and M behave in an opposite manner. At the end of winter, the N immobilization in the soil is first of all predominant. In the course of spring, the N mineralization increases, the N immobilization decreases. In middle European weather conditions, the maximum of mineralization has been achieved approximately at the beginning of June. Then, it decreases again, and immobilization increases. A second mineralization maximum is achieved approximately in the third September decade.

In correspondence with the different growth periods of the different agricultural cultivated varieties, different amounts for I and/or M apply for the different development phases.

The fertilizer utilization A illustrated in FIG. 10 is determined by the water retention capacity of the soil and the precipitation conditions. High seepage water rates occur in the case of high precipitations and/or low usable field capacity. The usable field capacity is again closely correlated with the productivity of the soils (see FIG. 10). The quantity of seepage water determines the so-called unavoidable nitrogen eluviation.

Under the following conditions it may be useful to set A to be greater than 1 (fertilizer utilization 100%):

a) water protection areas: In water protection areas it may be useful to dispense with maximum yields in order in keep the N concentration in the seepage water as low as possible. Values of A>1 are not possible in reality. If such values are assessed, this will always be related with certain losses of yield.

b) locations with long years of N overfertilization: In Germany, the N excess balance lies in the range of approx. 100 kg N/ha. In particular livestock holding farms have high N excess balances. Locations with long years of N overfertilization have a high nitrogen pool in the soils and a high risk potential of nitrate discharge. This high nitrogen pool may also be of disadvantage for the yield of the plants if too much N is released in the case of strong soil heating. In order to absorb this nitrogen pool it may be useful to assess higher values for A. In addition, an absorption of unnecessary N pools in the soil results in a reduction of the fertilizing effort, which also offers economic advantages.

FIG. 11 illustrates by way of example a soil map of a test field, wherein the sections with bright contrast level mark areas of low yield and the sections with dark contrast level mark areas of high yield. This illustration clearly reveals that, when considering the different yield areas, stages of development, plant qualities, etc., the quantity of fertilizer to be discharged has to fluctuate strongly in the different subareas. The soil map is stored digitally in the data memory 8, and then the subarea-specific fertilization is performed as a function of the position of the vehicle discharging the fertilizer which is, for instance, detected via GPS, so that the respective subareas are optimally provided with fertilizer and hence over or underfertilization may reliably be avoided, taking into account the remaining circumstances.

The correction factor DIMA may be less than or greater than 1. In early EC stages the N immobilization is predominant—DIMA is then greater than 1. In later EC stages the mineralization is predominant—DIMA is then correspondingly less than 1. Thus, it is, for instance, also warmer at later stages of development, so that the fertilizer is converted more quickly. In earlier stages of development it is vice versa. The duration of effect of the fertilizer also depends on EC stages. The partial factor A that stands for the utilization rate of the fertilizer is determined by the soil type and the precipitations. These two parameters determine essentially the so-called unavoidable N losses. If the subarea should be located in a water protection area, this partial factor A should be equal or close to 1. In practice, the factor A may also be less, for instance, 0.85.

In accordance with the illustration of FIG. 1, the curve progressions required for the calculation of the optimum N uptake are stored in the data memory 8 by means of tables/characteristics 12, so that the fertilizer requirement N may be ascertained, for instance, by the next stage of development in the afore-described manner under knowledge of the current N uptake, the stage of development, the yield range, the plant quality, the correction factor, and the other parameters mentioned above and included in the calculation. On the basis of this fertilizer requirement N, the evaluation unit 6 then outputs a control signal 14 to a fertilizer distributer 16 and the fertilizer is then dosed in correspondence with this control signal 14. This way, only such quantity of fertilizer is dosed for every partial agricultural plot which the plants can utilize productively. In this respect, a different regular curve may be available for every partial agricultural plot, so that a highly precise subarea-specific fertilizer discharge is enabled.

The device according to the invention of FIG. 1 and the afore-described method enable an absolute measurement of the N uptake under all environment conditions, in particular for all culture varieties. The calculation of the subarea-specific N fertilizer requirement is performed under consideration of the current N uptake, the productivity of the location, the commercialization direction of the product (product quality), the duration of effect of the fertilizer, the N mineralization, and the N immobilization. This enables a highly precise subarea-specific N fertilizer dosing, taking into account the environment conditions. Such a solution is highly superior to the initially explained prior art solutions.

The invention has been explained for a determination of the nitrogen requirement it may basically also be used for determining other kinds of fertilizer.

A method and a device for discharging fertilizer for agricultural cultivated plants are disclosed. According to the invention, the required quantity of fertilizer is determined depending on the current nutrient uptake (nutrient status), optimum nutrient uptake (nutrient requirement) by the fertilizing deadline, and optimum nutrient uptake (nutrient requirement) by the next fertilizing deadline, wherein other influencing factors are taken into consideration via a correction factor DIMA.

The invention claimed is:

1. A method for dosing nutrient to a partial agricultural plot, wherein the nutrient requirement, in particular the N fertilizer requirement of an agricultural cultivated plant, comprising the steps of:

(a) storing characteristic diagrams/tables for the current nutrient uptake ($N_{cur}$) of the plant as a function of a vegetation index, and a stage of development (EC) and/or the yield to be expected in a data memory;

(b) storing characteristic diagrams/tables for the optimum nutrient uptake ($N_{opt}$) of the plant as a function of the stage of development (EC) and/or the yield to be expected in a partial agricultural plot to be fertilized;

(c) measuring the vegetation index in the partial agricultural plot and reading out the current nutrient uptake ($N_{cur}$) from the characteristic diagram/table as a function of the yield and/or the stage of development (EC);

(d) reading out the optimum nutrient uptake ($N_{opt}$) with the stage of development (EC) and/or the yield to be expected from the characteristic diagram/table;

(e) using a processor (i) configured with a program that calculates the quantity of nutrient (N) from the difference between the optimum nutrient uptake (nutrient requirement $N_{opt}$) and the current nutrient uptake (current nutrient status $N_{cur}$), and (ii) configured with a program to correct the amount of (N) by offsetting against a correction factor (DIMA) in which at least one of the parameters of duration of effect of the fertilizer (D), fertilizer immobilization (I) in the soil, mineralization (M) from the soil, and fertilizer utilization rate (A) is included, and then using the corrected amount of (N) to generate a control signal that the processor outputs to a fertilizer distributor causing the fertilizer distributor to dose nutrient in accordance with the control signal; and wherein the quantity of nutrient (N) is calculated from the difference pursuant to step (e) plus the difference from the optimum nutrient uptake ($N_{opt+1}$) by the next fertilizing deadline and the optimum nutrient uptake, this latter difference also corrected by offsetting against the correction factor (DIMA), and wherein the processor modifies the control signal based on the optimum nutrient uptake ($N_{opt+1}$), the processor transmitting the modified control signal to the fertilizer distributor causing the fertilizer distributor to dose nutrient in accordance with the modified control signal.

2. A method for dosing nutrient to a partial agricultural plot, wherein the nutrient requirement, in particular the N fertilizer requirement of an agricultural cultivated plant, comprising the steps of:

(a) storing characteristic diagrams/tables for the current nutrient uptake ($N_{cur}$) of the plant as a function of a vegetation index, and a stage of development (EC) and/or the yield to be expected in a data memory;

(b) storing characteristic diagrams/tables for the optimum nutrient uptake ($N_{opt}$) of the plant as a function of the stage of development (EC) and/or the yield to be expected in a partial agricultural plot to be fertilized;

(c) measuring the vegetation index in the partial agricultural plot and reading out the current nutrient uptake ($N_{cur}$) from the characteristic diagram/table as a function of the yield and/or the stage of development (EC);

(d) reading out the optimum nutrient uptake ($N_{opt}$) with the stage of development (EC) and/or the yield to be expected from the characteristic diagram/table;

(e) using a processor (i) configured with a program that calculates the quantity of nutrient (N) from the difference between the optimum nutrient uptake (nutrient requirement $N_{opt}$) and the current nutrient uptake (current nutrient status $N_{cur}$), and (ii) configured with a program to correct the amount of (N) by offsetting against a correction factor (DIMA) in which at least one of the parameters of duration of effect of the fertilizer (D), fertilizer immobilization (I) in the soil, mineralization (M) from the soil, and fertilizer utilization rate (A) is included, and based on the corrected amount of (N), generating a control signal that the processor outputs to a fertilizer distributor causing the fertilizer distributor to dose nutrient in accordance with the control signal, wherein the characteristics associated with the current nutrient uptake, which is based on vegetation index, are formed in a first approximation from, $$N_{cur}=(a)*(\text{vegetation index})+y$$

or from sections of a plot corresponding to $N_{cur}$, wherein a is the slope and y is the intercept.

3. The method according to claim 2, wherein the intercept y is determined by a straight line $$y=(a*)*(N*)+b*$$

wherein a* and b* are coefficients based on measuring results associated with an agricultural cultivated plant, and wherein N* is the medium N uptake of the plant in the stage of development and with the assumed yield potential and y decreases with increasing medium N uptake (N*) (negative slope).

4. The method according to claim 2, wherein the slope a is determined by a straight line $$a=(a**)*(N*)+b**$$

wherein a and b are coefficients based on measuring results associated with an agricultural cultivated plant, and wherein a increases with N* (positive slope).

5. The method according to claim 2, wherein the current nutrient and optimum nutrient characteristic tables are also established as a function of the plant quality.

6. The method according to claim 2, wherein the vegetation index is the REIP.

7. The method according to claim 2, wherein DIMA is greater than 0.5 and less than 1.5.

8. The method according to claim 7, wherein DIMA depends on the stage of development.

9. A device for discharging nutrient, comprising a memory for storing characteristics/tables for the current nutrient uptake or the optimum nutrient uptake as a function of the stage of development of the plant in the partial agricultural plots to be fertilized, the quality of the plants in the partial agricultural plots, and/or the yield to be expected in the partial agricultural plots, and of correction factors (DIMA), comprising a sensor for collecting a vegetation index, a CPU configured to execute a program to select the suitable characteristic/table and for reading out the current nutrient uptake (nutrient status $N_{cur}$), the optimum nutrient uptake ($N_{opt}$), and the correction factor (DIMA), and to calculate the optimum quantity of nutrient (N) from these parameters pursuant to the method of claim 1 including:

storing characteristic diagrams/tables for the current nutrient uptake ($N_{cur}$) of the plant as a function of a vegetation index, and a stage of development (EC) and/or the yield to be expected in a data memory;

(b) storing characteristic diagrams/tables for the optimum nutrient uptake ($N_{opt}$) of the plant as a function of the stage of development (EC) and/or the yield to be expected in a partial agricultural plot to be fertilized;

(c) measuring the vegetation index in the partial agricultural plot and reading out the current nutrient uptake ($N_{cur}$) from the characteristic diagram/table as a function of the yield and/or the stage of development (EC);

(d) reading out the optimum nutrient uptake ($N_{opt}$) with the stage of development (EC) and/or the yield to be expected from the characteristic diagram/table;

(e) using a processor (i) configured with a program that calculates the quantity of nutrient (N) from the difference between the optimum nutrient uptake (nutrient requirement $N_{opt}$) and the current nutrient uptake (current nutrient status $N_{cur}$), and (ii) configured with a program to correct this amount by offsetting against a correction factor (DIMA) in which at least one of the parameters of duration of effect of the fertilizer (D), fertilizer immobilization (I) in the soil, mineralization (M) from the soil, and fertilizer utilization rate (A) is included, and then using the corrected amount of (N) to generate a control signal that the processor outputs to a fertilizer distributor causing the fertilizer distributor to dose nutrient in accordance with the control signal;

wherein the CPU is also configured to output a control signal, and further comprising a fertilizer distributor for dosing nutrient in accordance with the control signal; and wherein the quantity of nutrient (N) is calculated from the difference pursuant to step (e) plus the difference from the optimum nutrient uptake ($N_{opt+1}$) by the next fertilizing deadline and the optimum nutrient uptake, this latter difference also corrected by offsetting against the correction factor (DIMA), and wherein the CPU modifies the control signal based on the optimum nutrient uptake ($N_{opt+1}$), the processor transmitting the modified control signal to the fertilizer distributor causing the fertilizer distributor to dose nutrient in accordance with the modified control signal.

* * * * *